United States Patent
Ishidera

(10) Patent No.: US 7,973,656 B2
(45) Date of Patent: Jul. 5, 2011

(54) SUSPICIOUS ACTIVITY DETECTION APPARATUS AND METHOD, AND PROGRAM AND RECORDING MEDIUM

(75) Inventor: Eiki Ishidera, Tokyo (JP)

(73) Assignee: NEC Corporation, Tokyo (JP)

( * ) Notice: Subject to any disclaimer, the term of this patent is extended or adjusted under 35 U.S.C. 154(b) by 278 days.

(21) Appl. No.: 12/302,925

(22) PCT Filed: Apr. 25, 2007

(86) PCT No.: PCT/JP2007/058936
§ 371 (c)(1),
(2), (4) Date: Dec. 1, 2008

(87) PCT Pub. No.: WO2007/138811
PCT Pub. Date: Dec. 6, 2007

(65) Prior Publication Data
US 2009/0243844 A1    Oct. 1, 2009

(30) Foreign Application Priority Data
May 31, 2006 (JP) .................. 2006-152582

(51) Int. Cl.
*G08B 1/08* (2006.01)
(52) U.S. Cl. .............. 340/539.22; 340/539.25; 340/517; 340/522; 382/103; 382/100; 382/156
(58) Field of Classification Search .................. 340/522, 340/539.11, 517, 573.1, 573.4, 539.22, 539.25; 382/103, 100, 156
See application file for complete search history.

(56) References Cited

U.S. PATENT DOCUMENTS
2003/0197612 A1   10/2003   Tanaka et al.

FOREIGN PATENT DOCUMENTS

| JP | 07-134767 | 5/1995 |
| JP | 08-163652 | 6/1996 |
| JP | 09-330415 | 12/1997 |
| JP | 2000-501253 | 2/2000 |
| JP | 2003-132469 | 5/2003 |
| JP | 2004-005511 | 1/2004 |
| JP | 2004-070542 | 3/2004 |
| JP | 2004-110690 | 4/2004 |
| JP | 2004-127142 | 4/2004 |
| JP | 2004-178258 | 6/2004 |
| JP | 2004-240839 | 8/2004 |
| JP | 2005-011057 | 1/2005 |
| JP | 2005-135230 | 5/2005 |
| JP | 2005-292942 | 10/2005 |
| JP | 2005-316945 | 11/2005 |
| WO | 00/75897 | 12/2000 |

OTHER PUBLICATIONS

European Patent Office issued an European Search Report dated Jun. 8, 2010, Application No. 07742371.3.

*Primary Examiner* — Benjamin C Lee
*Assistant Examiner* — Peter C Mehravari
(74) *Attorney, Agent, or Firm* — Young & Thompson

(57) ABSTRACT

A device for detecting a suspicious activity, efficiently performing surveillance of a person and vehicle detected by a surveillance camera. The device uses signal generation means, a sensor for receiving a signal from the signal generation means, and image data taken by the camera. The device detects mobile bodies, such as a person and a vehicle, included in an image taken by the camera and uses them as mobile body information, uses as authentication information an ID number represented by a signal received by the sensor, defines permitted activities and prohibited activities according to authorized activities corresponding to authentication information, and issues an alarm when the device detects that an activity represented by mobile body activity information is a illegal or prohibited activity.

6 Claims, 6 Drawing Sheets

NO AUTHENTICATION INFORMATION AT TIME t

AUTHENTICATION INFORMATION 51
TAKES PLACE AT TIME t+1

EXAMPLE OF CAMERA IMAGE OF AIRPORT PASSAGE

EXAMPLE OF CAMERA IMAGE OF PLATFORM OF STATION

SUSPICIOUS ACTIVITY DETECTION APPARATUS AND METHOD, AND PROGRAM AND RECORDING MEDIUM

TECHNICAL FIELD

The present invention relates to a surveillance technology, particularly to an apparatus and method of detecting suspicious activity, abnormal activity, and prohibited activity using an authentication sensor and a camera image.

BACKGROUND ART

There have been so far proposed many methods for automatically issuing an alarm by detecting a person or a vehicle from an image taken by a camera and analyzing the activities thereof.

Specific techniques for performing the above described method include, for example, a technique disclosed in Non-Patent Document 2 ("A System for Video Surveillance and Monitoring" tech. report CMU-RI-TR-00-12, Robotics Institute, Carnegie Mellon University, May, 2000.) and a technique used in the product, called VEW, of ObjectVideo, Inc.

According to these techniques, it is possible to issue an alarm by automatically detecting an illegal activity or prohibited activity such as when a person or a vehicle intrudes into a zone designated as no-admittance, and when a person or a vehicle crosses a dividing line which the person or vehicle is prohibited from crossing.

However these techniques have a problem in that an alarm will be issued as a prohibited activity as an illegal activity even for a person or vehicle having an authorization as in the case of an ordinary person and vehicle, for example, when a relevant person authorized to enter a zone of "No Admittance without Authorization" or enters the region of "No Admittance without Authorization", when an ambulance car enters an intersection during a red light, and the like.

On the other hand, various usage forms of RFID (Radio Frequency IDentification) are known as an authentication device and are being applied to, for example, entrance and exit control in which the authority to access a building or office is authenticated by RFID and the gate is opened to admit a person or vehicle who/which has been authenticated as having authority to enter through the gate.

Further, when only personnel are targeted, there are also known methods which utilize biometric authentication based on face, fingerprint, vein, or iris feature.

However, in a surveillance system which utilizes RFID alone, since the absence of a RFID response is equivalent to no occurrence of event, a problem exists in that a sufficient surveillance function cannot be achieved unless all the personnel to be monitored carry RFID with them, and therefore the application range of such a system is limited.

It is difficult to achieve an effective surveillance system by using RFID alone particularly in a region or public area such as a lobby of a building, a railway station, and an air port etc. where there are many people who do not carry RFID with themselves.

Moreover, a similar problem exists even in the case of biometric authentication, and it is necessary to support an environment a situation in which all the personnel to be monitored can be authenticated, resulting in a large burden on data management.

Further, there is also a problem in which it is not possible to perform detailed analysis of a person or vehicle to be monitored only by RFID or biometric authentication, and in which it is only possible to perform a coarse surveillance such as monitoring at what time and through which gate the person or vehicle has passed, and at what time and in which place the person or vehicle is present, and the like.

For example, Patent Document 1 (Japanese Patent Laid-Open No. 2004-127142) discloses a method in which the validity of a person who enters a predetermined space is determined by authenticating a person which has authority to enter/utilize the space by using an IC card and the like; however, this technique has a problem in that it is only possible to determine the validity of the entrance of a particular person into a particular place, and not possible to determine the validity of the activity of a particular person or vehicle at a particular place.

Patent Document 2 (Japanese Patent Laid-Open No. 2005-11057) discloses a method in which the accuracy is enhanced by combining an image surveillance and sensor surveillance such as RFID.

According to the technique of Patent Document 2, it is possible to obtain detailed dynamic information of a person or object etc., which cannot be recognized only through image information taken by a camera etc.

Further, according to the technique of Patent Document 2, since every person is supposed to possess a RFID tag in a place such as a corporate site, when a person is detected but there is no response of RFID, it is possible to regard the person as a suspicious person thereby issuing an alarm.

However, since this technique utilizes only the information about simply whether or not a subject to be monitored possesses a RFID tag or GPS terminal, and does not authenticate a subject who has authorization, it is difficult to perform precise alarm control such as follows.

That is, there is a problem in which an alarm is erroneously issued even for a person who has authorization because of the absence of applying precise surveillance policies that correspond to this authorization, such as: when a person is authorized to enter any place, the person is excluded from the subject to be monitored and no alarm will be issued; when a person is permitted to enter only a particular area, entering non-permitted area will be regarded as an illegal activity, and an alarm will be issued; when a person is not permitted entry at all or does not possess a RFID tag, alarm is to be generated as soon as the person is detected; even when a person traveling in the opposite direction is detected on a path on which traveling in the opposite direction is prohibited, an alarm will not be issued if the person has a specific authorization to travel in the opposite direction; even when a person traveling in the opposite direction is detected on a path on which traveling in the opposite direction is prohibited, an alarm will not be issued if the person has a specific authorization to travel in the opposite direction; even when a person standing still is detected on a path on which standing still is prohibited, alarm will not be issued if a person has a specific authorization to stand still.

Patent Document 1: Japanese Patent Laid-Open No. 2004-127142,
Patent Document 2: Japanese Patent Laid-Open No. 2005-11057,
Non-Patent Document 2: "A System for Video Surveillance and Monitoring" tech. report CMU-RI-TR-00-12, Robotics Institute, Carnegie Mellon University, May, 2000.

DISCLOSURE OF THE INVENTION

In the technique disclosed in Non-Patent Document 2, there is a problem in which even when a person or vehicle has an authorization, an alarm is issued indicating a prohibited activity or violation in the same manner as in the case of an ordinary person and vehicle.

In a surveillance system which utilizes only RFID, since the absence of any RFID response is equivalent to the fact that there is no event, a sufficient surveillance function cannot be achieved unless all the subjects to be monitored carry RFID with them, thus causing a problem in that the application range of such a system is limited. This is also true in the case of biometric authentication, and therefore it is necessary to support an environment in which all the subjects to be monitored can be authenticated, thereby imposing a large burden on data management.

Further, there is also a problem in which it is not possible to perform detailed analysis of a person or vehicle to be monitored only by RFID or biometric authentication, and in which it is only possible to perform rough surveillance such as monitoring at what time and through which gate the person or vehicle has passed, and at what time and in which place the person or vehicle is present, and the like.

Since the technique disclosed in Patent Document 2 utilizes only the information on simply whether or not a subject to be monitored possesses a RFID tag or GPS terminal and does not authenticate a subject who has authorization to be monitored, it is not possible to apply precise surveillance policies corresponding to the authorization, thereby causing a problem that an alarm may be erroneously issued even for a person having an authorization.

It is an object of the present invention to solve the above described problems and to provide a suspicious activity detection apparatus and method which makes it possible to precisely analyze the activity of a person or vehicle to be monitored even without assuming a situation in which all the personnel and vehicles to be monitored carry RFID with them or in which they may be subject to biometric authentication, and to automatically detect an illegal activity and a prohibited activity generate an alarm but without issuing an unnecessary alarm if the activity is within the range of the authorization given to the person or vehicle to be monitored.

A suspicious activity detection apparatus according to the present invention is a suspicious activity detection apparatus for detecting suspicious activity by using signal generation means, a sensor for receiving a signal from the aforementioned signal generation means, and image data taken by a camera, comprising:

an image input section, which captures image data from the aforementioned camera and outputs the aforementioned image data;

an activity analysis section, which detects a mobile object such as a person and a vehicle included in an image indicated by image data from the aforementioned image input section, recognizes if the detected mobile object is a person, a vehicle, or something other than these, acquires the position of the detected object, and further extracts a motion trajectory of the detected object to output the thus obtained information as mobile-object activity information;

an authentication information input section, which acquires the ID number indicated in the aforementioned signal received by the aforementioned sensor, a reception time and a reception position of the aforementioned signal by means of the output of the aforementioned sensor, and outputs the thus obtained information as authentication information;

an authorization authentication section, which stores authorization information corresponding to the aforementioned authentication information, obtains authorization information corresponding to the inputted authentication information from the aforementioned authentication information input section and outputs the aforementioned inputted authentication information with the aforementioned obtained authorization information added thereto;

an information integration section, which brings authentication information added with authorization information inputted from the aforementioned authorization authentication section into correspondence with mobile-object activity information inputted from the aforementioned activity analysis section, and which outputs the mobile-object activity information with the authorization information added thereto;

an activity determination section, which includes a list of a permitted activity and a prohibited activity depending on authorization, recognizes a predetermined violating activity and a prohibited activity by referring to the aforementioned list, with respect to the authorization added to the mobile-object activity information inputted from the aforementioned information integration section, and when detecting that the activity indicated by the mobile-object activity information is an illegal activity or a prohibited activity, generates and outputs alarm information; and an output section, which outputs an alarm when inputted with alarm information from the aforementioned activity determination section.

In this case, mobile-object activity information may be configured such that when it which does not correspond to any authentication information is inputted, the aforementioned activity determination section recognizes the authorization level with respect to the mobile-object activity information to be the lowest level.

Further, authentication information may be configured such that when there is it does not correspond to any mobile-object activity information, the aforementioned activity determination section creates tentative mobile-object activity information to bring it into correspondence with the authentication information, and recognizes the authorization level thereof to be the lowest level.

A suspicious activity detection apparatus according to the present invention is a suspicious activity detection apparatus for detecting a suspicious activity by using signal generation means, a sensor for receiving a signal from the aforementioned signal generation means, and image data taken by a camera, comprising:

an image input section, which captures image data from the aforementioned camera and outputs the aforementioned image data;

an activity analysis section, which detects a mobile object such as a person and a vehicle included in an image indicated by image data from the aforementioned image input section, recognizes if the detected mobile object is a person, a vehicle, or something other than these, acquires the position of the detected object, and further extracts a motion trajectory of the detected object to output the thus obtained information as mobile-object activity information;

an authentication information input section, which acquires an ID number indicated in the aforementioned signal received by the aforementioned sensor, a reception time and a reception position of the aforementioned signal by means of the output of the aforementioned sensor, and outputs thus obtained information as authentication information;

an authorization authentication section, which stores authorization information corresponding to the aforementioned authentication information as well as a template of a uniform or clothes; obtains a partial image of a person by referring to the position of the person from mobile-object activity information from the aforementioned activity analysis section; compares the aforementioned partial image with the uniform or clothes stored in the aforementioned template; and when there is a uniform or clothes whose similarity is higher than a predetermined threshold, obtains authentication information inputted from the aforementioned authentication information input section with information about the uniform or clothes being the authentication information, or obtains authorization information corresponding to recognition information which is information about the uniform and clothes, to output the inputted authentication information with the aforementioned authorization information being added thereto;

an information integration section, which brings authentication information added with authorization information inputted from the aforementioned authorization authentication section into correspondence with mobile-object activity information inputted from the aforementioned activity analysis section, and outputs the mobile-object activity information with the authorization information added thereto;

an activity determination section, which includes a list of permitted activities and prohibited activities depending on authorization, recognizes a predetermined violating activity and a prohibited activity by referring to the aforementioned list, with respect to the authorization added to the mobile-object activity information inputted from the aforementioned information integration section, and when detecting that the activity indicated by the mobile-object activity information is an illegal activity or a prohibited activity, generates and outputs alarm information; and an output section, which outputs an alarm when inputted with alarm information from the aforementioned activity determination section.

In this case, mobile-object activity information may be configured such that it does not correspond to any authentication information is inputted, the aforementioned authorization authentication section sets the authorization level with respect to the mobile-object activity information to be the lowest level.

Further, authentication information may be configured such that when there is it does not correspond to any mobile-object activity information, the aforementioned authorization authentication section creates tentative mobile-object activity information to bring it into correspondence with the aforementioned authentication information, and sets the authorization level thereof to be the lowest level.

In either of the above described cases, it may be configured such that the list of permitted activities and prohibited activities in the aforementioned activity determination section is varied depending on time.

Further, aforementioned activity determination section may also be configured such that it applies an authorization that was added to one mobile-object activity information to other mobile-object activity information.

A program according to the present invention causes a computer system to execute the processing performed in each of the above described components, and a recording medium according to the present invention stores the aforementioned program.

In the present invention, the activity analysis section is configured such that a person or vehicle is detected so that the detection of the position thereof and the extraction of the motion trajectory thereof are performed; and the authorization authentication section is configured such that the authorization information of a person or vehicle is extracted to detect the position at which the authorization information is detected. In the information integration section, the position at which the authorization information is detected and the position of a person or vehicle that is calculated from an image are compared to obtain the authorization level of the person or vehicle detected by the image. If authorization information is not detected even though a person or vehicle has been detected in an image, the level of authorization is set to be at the lowest level.

In the activity determination section, referring to the list of permitted activities and prohibited activities depending on the authorization of the detected person or vehicle, an alarm information is generated when an illegal activity or a prohibited activity is detected.

Thus, for example, even when a person is detected in a zone of "no admittance without authorization", alarm information will not be created if the person is permitted entry; with reference to authorization information, it is possible to reduce the number of times undesired or erroneous alarm information is generated, thereby enabling efficient surveillance.

DESCRIPTION OF SYMBOLS

Figure 1:
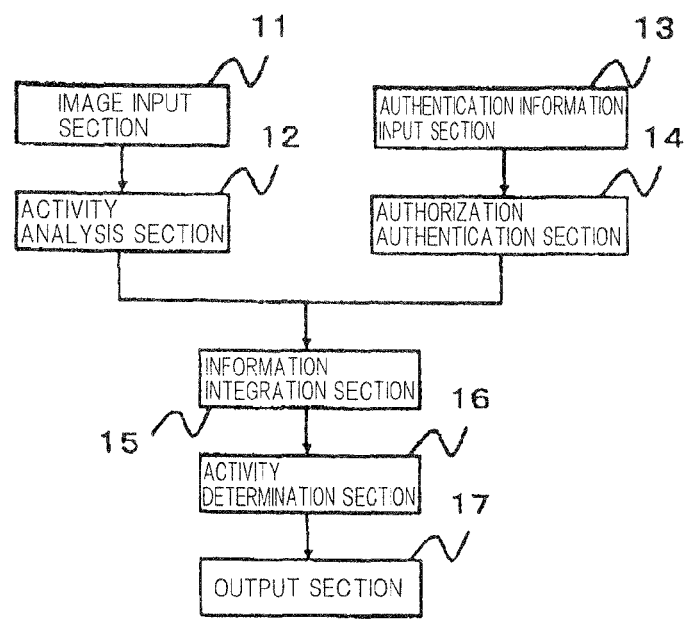
FIG. 1 is a block diagram of a graphic reader according to an exemplary embodiment.

11 Image input section
12 Activity analysis section
13 Authentication information input section
14 Authorization authentication section
15 Information integration section
16 Activity determination section
17 Output section
21 image input processing
22 Activity analysis processing
23 Authentication information input processing
24 Authorization authentication processing
25 Information integration processing
26 Activity determination processing
27 Output processing

BEST MODE FOR CARRYING OUT THE INVENTION

Next, exemplary embodiments will be described with reference to the drawings.

FIG. 1 is a block diagram to show the configuration of an exemplary embodiment of a graphics reader according to the present invention.

Figure 2:
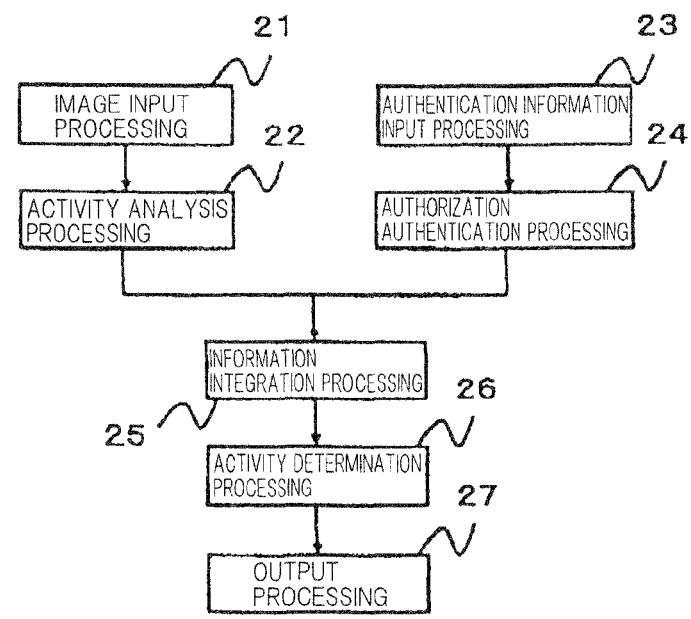
FIG. 2 is a flowchart of the graphic reading scheme according to the exemplary embodiment.

The exemplary embodiment includes, as shown in the figure, image input section 11, activity analysis section 12, authentication information input section 13, authorization authentication section 14, information integration section 15, activity determination section 16, and output section 17; and each of these section executes image input processing 21, activity analysis processing 22, authentication information input processing 23, authorization authentication processing 24, information integration processing 25, activity determination processing 26, and output processing 27 shown in FIG. 2.

Image input section 11, which can be easily made of a normal CCD camera and a memory, captures image data indicating an image taken by a camera etc. and outputs it to activity analysis section 12.

Activity analysis section 12 detects a mobile object (image) such as a person and a vehicle included in an image indicated by image data inputted from image input section 11, recognizes if the detected mobile object is a person, a vehicle, or something other than these, acquires the position of the detected object, and further extracts a motion trajectory of the detected object to output the thus obtained information to information integration section 15 as mobile-object activity information.

Authentication information input section 13, which can be readily made up of a normal RFID reader, a memory, and control means (CPU), acquires an ID number of a person or vehicle, and the time and position at which the ID number is read out with a sensor (not shown), and outputs the thus obtained information as authentication information to authorization authentication section 14.

Authorization authentication section 14, which includes storage means for storing authentication information and corresponding authorization information, acquires authorization information corresponding to the authentication information inputted from authentication information input section 13, and outputs the inputted authentication information with the obtained authorization information added thereto to information integration section 15.

It is noted that for authentication information input section 13, it is also possible to use, for example, face, fingerprint, vein, iris, and clothes authentication, and optical ID tag or GPS-equipped portable phone authentication etc. When face, iris, and clothes authentication or an optical ID tag authentication is utilized, authentication information input section 13 can easily be made up of an ordinary CCD camera, a memory, and a CPU. When fingerprint authentication is utilized, it can easily be made up of an ordinary fingerprint sensor, a memory, and a CPU. When vein authentication is utilized, it can be easily be made up of an ordinary vein sensor, a memory, and a CPU.

Further, for authentication information input section 13, it is also possible to use an ordinary GPS and a GPS portable terminal such as a GPS-equipped portable telephone etc.

Information integration section 15 brings authentication information added with authorization information which is inputted from authorization authentication section 14 into correspondence with the mobile-object activity information inputted from activity analysis section 12, and outputs the mobile-object activity information with the authorization information added thereto, to activity determination section 16.

Activity determination section 16, which includes a list of permitted activities and prohibited activities depending on authorization, recognizes a predetermined violating activity and a prohibited activity by referring to the aforementioned list, with respect to the authorization added to the mobile-object activity information inputted from the aforementioned information integration section 15, and when detecting that the activity indicated by the mobile-object activity information is an illegal activity or a prohibited activity, generates and outputs alarm information to output section 17.

Output section 17 outputs an alarm when inputted with alarm information from activity determination section 16.

Activity analysis section 12, authorization authentication section 14, information integration section 15, activity determination section 16, and output section 17 can be easily constructed on an ordinary computer or a PDA terminal.

In activity analysis processing 22 that is performed at activity analysis section 12, a mobile object is detected from an image, and the mobile object is recognized if it is a person, a vehicle, or something other than these, the position of the mobile object is acquired, a motion trajectory of the mobile object is extracted, and time information is also acquired to create mobile-object activity information.

As algorithm for detecting a mobile object, it is possible to use algorithm based on the method, for example described in "A System for Video Surveillance and Monitoring" tech. report CMU-RI-TR-00-12, Robotics Institute, Carnegie Mellon University, May, 2000. such as an algorithm to recognize whether the detected mobile object is a person, a vehicle, or something other than these, and an algorithm to acquire the position of the mobile object and to extract the motion trajectory thereof in activity analysis processing 22 that is performed at activity analysis section 12.

Mobile object activity information can obtain, as time series information, information, such as, for example, time information, the circumscribing rectangle of a mobile object on an image, and information in which the result of recognizing a mobile object is a person, a vehicle, or something other than these.

Further, by using a camera which has undergone a camera calibration for correlating real world coordinates with the camera image coordinates, and by using a map of the vicinity of the place where the camera is installed, it is possible to obtain values which are obtained by converting the coordinates of a mobile object position on an image into coordinates on a map.

The motion trajectory may be time series information of the center point, or the middle point of the lower side of the circumscribing rectangle of a mobile object on an image, and may also be the information obtained by converting the aforementioned points into coordinates on the map.

The mobile-object activity information can be obtained in real time so that measurements can be made N times per second to obtain time series information, where, N may be a positive integer of, for example, 1 to 30.

In authentication information input processing 23 performed at authentication information input section 13, authentication information is created. The authentication information includes an ID number which is read out, a time at which the ID number is read out, and position information of the place where the ID number is read out.

As a more detailed description, in authentication information input processing 23 performed at authentication information input section 13, when RFID or optical ID is used, the ID number of the RFID or optical ID read out, and the time at which the ID number is read out are acquired to create authentication information.

The position information may be, for example, the coordinates of the installation place of a RFID reader or optical ID sensor, on the map. Moreover, when using a camera which has undergone a camera calibration for correlating real world coordinates with the camera image coordinates, the position information may be the values which are obtained by converting the coordinates on an image obtained by image input processing 21 performed at image input section 11 into real world coordinates.

When three or more RFID readers are utilized using RFID of UHF band or active RFID etc. which has a wide detection range, it is possible to obtain position coordinates of each RFID reader on a map and to measure the radio wave strength of the RFID by triangulation so that the position coordinates of the RFID on a map are acquired to be used as position information.

Further, using a camera which has undergone a camera calibration for correlating real world coordinates with the camera image coordinates makes it possible to convert the coordinates on an image obtained by image input processing 21 performed at image input section 11 into values of real world coordinates.

Further, in this case, it is possible to obtain the position information of RFID in real time if it is within the detection range of RFID, and it is also possible to obtain and output the position information as a time series by measuring it N times per second. At this moment, N may be a positive integer of, for example, 1 to 30.

In particular, when the object to be authenticated is a person, and when face, fingerprint, vein, or iris authentication is used, it is possible to create authentication information from the ID number of the authenticated person and from the time at which the person is authenticated by referring to a list of prestored biometric information.

Further, the position information may be, for example, the coordinates on a map of the installation place of a fingerprint authentication sensor, a vein authentication sensor, or an iris authentication sensor.

Further, using a camera which has undergone a camera calibration for correlating real world coordinates with the camera image coordinates makes it possible to convert coordinates on an image obtained by image input processing 21 performed at image input section 11 into values of real world coordinates.

When a face authentication sensor is used, it is possible to regard the coordinates of a face on an image detected in the course of face authentication as position information since the detection of face position is typically performed for face authentication.

Further by using a camera which has undergone camera calibration for correlating real world coordinates with the camera image coordinates, and by using a map of the vicinity of the place where the camera is installed, it is also possible to obtain coordinate values of a mobile object by converting its coordinates on an image into coordinates on the map.

Further, in the case of face authentication, it is possible to obtain the position of a face in real time, and is also possible to obtain the position information of the face of a person, the time of measurement, and the ID number of the person as a time series by measuring the face position N times per second, and use it as authentication information. At this moment, N may be a positive integer of, for example, 1 to 30.

Figure 3:
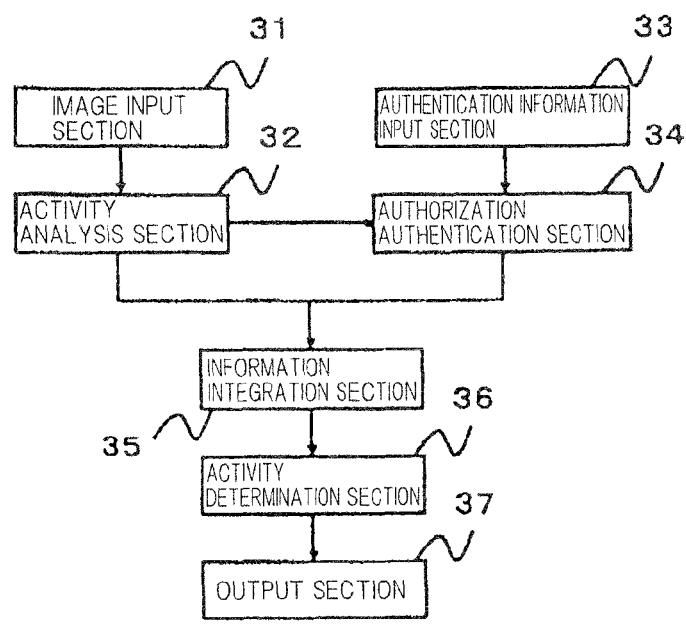
FIG. 3 is a block diagram of the graphic reader according to the exemplary embodiment.

FIG. 3 is a block diagram to show the configuration of a graphics reader when the object to be authenticated is a person and when clothes authentication is used.

The apparatus shown in FIG. 3 comprises image input section 31, activity analysis section 32, authentication information input section 33, authorization authentication section 34, information integration section 35, activity determination section 36, and output section 37.

Although the operation of each section in the exemplary embodiment is similar to that of image input section 11, activity analysis section 12, authentication information input section 13, authorization authentication section 14, information integration section 15, activity determination section 16, and output section 17 shown in FIG. 1, in authorization authentication section 34 in the exemplary embodiment, a template of a uniform or clothes is stored, a partial image of a person is obtained with reference to the position of the person according to the mobile-object activity information from activity analysis section 32 and is compared with the uniform or clothes stored in the template; and when there is a uniform or clothes whose similarity is higher than a predetermined threshold, the information about the uniform and clothes is regarded as recognition information, and authorization information corresponding to the recognition information is obtained and is added to the inputted authentication information to be outputted.

As the measure of the similarity in authentication information creation, a likelihood, a simple similarity, and a (Dmax−distance value) etc. can be used, where Dmax is a predetermined positive integer. Further, the position information and the time information can provide the same information as the mobile-object activity information obtained in activity analysis section 12 and activity analysis processing 22.

Further, in recent years, there is proposed an optical ID in which light is caused to blink in a fixed time period to represent a bit string for the identification and position detection of an object. When authentication is performed using such optical ID, it is also possible to adopt the configuration as shown in FIG. 3.

It is possible to create authentication information by obtaining a partial image with reference to the position of a person or vehicle according to the mobile-object activity information obtained in activity analysis section 32 to detect an optical ID, and by reading out the ID number.

Further, position information and time information can provide the same information as mobile-object activity information acquired by activity analysis processing 22 in activity analysis section 12.

In authorization authentication processing 24 at authorization authentication section 14, an authorization level is added to the authentication information by referring to a tabular database including predetermined ID numbers and authorization levels corresponding thereto, for example, using an ID number of authentication information as a key.

In information integration processing 25 at information integration section 15 in FIG. 1, mobile-object activity information and authentication information which are confirmed to be at around the same time, or determined to be closest in time, are compared to acquire which mobile object information corresponds to which authentication information, thus adding an authorization level to the mobile-object activity information.

As an algorithm to compare the mobile-object activity information obtained from an image with the authentication information obtained from various sensors and to acquire the correspondence thereof, various algorithms, for example, the technique disclosed in Patent Document 2 described above, may be used.

Further, as an algorithm which compares the mobile-object activity information obtained from an image and the authentication information obtained from various sensors and which acquires the correspondence between them when active RFID is used, an algorithm to be described below using an example shown in FIG. 4 can be used.

Figure 4:
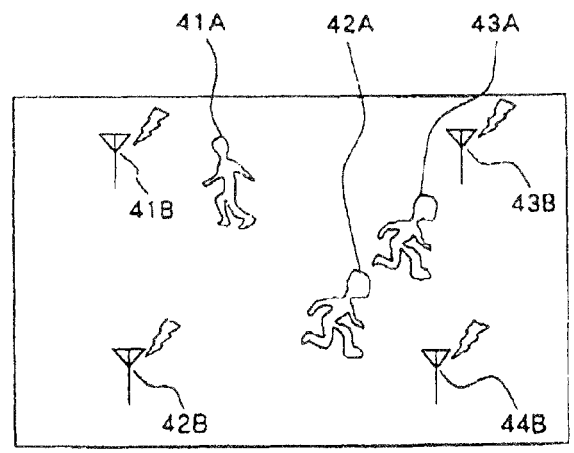
FIG. 4 shows an example in which a camera image is converted into coordinates on a map.

FIG. 4 shows an image which is obtained by converting a camera image into coordinates on a map.

Each of persons 41A to 43A carries active RFID tags, and sensors 41B to 41B receive a signal from active RFID which each of persons 41A to 43A carries.

Figure 5:
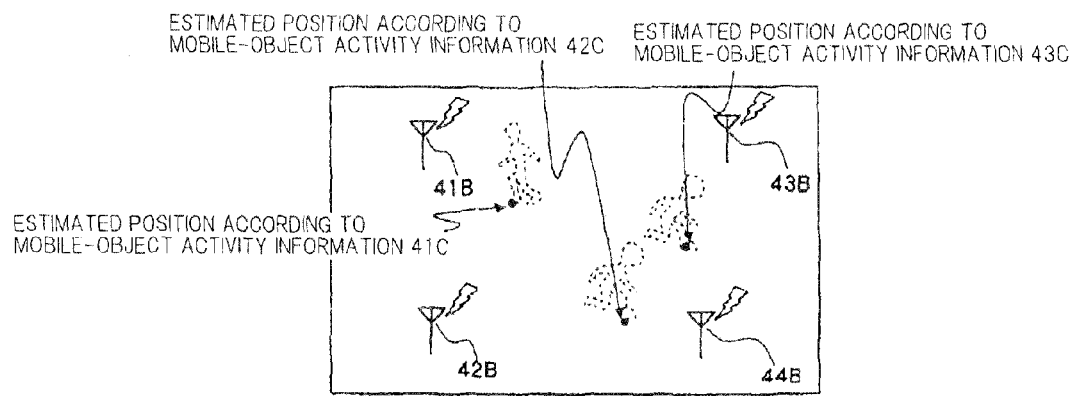
FIG. 5 shows an example of the position according to mobile-object activity information acquired from a camera image.

FIG. 5 shows estimated positions by mobile-object activity information 41C to 43C obtained at activity analysis section 12 (or 32).

Activity analysis section 12 (or 32) acquires mobile-object activity information 41C to 43C from a camera image. The estimated positions by mobile-object activity information 41C to 43C are positions shown in FIG. 5.

Figure 6:
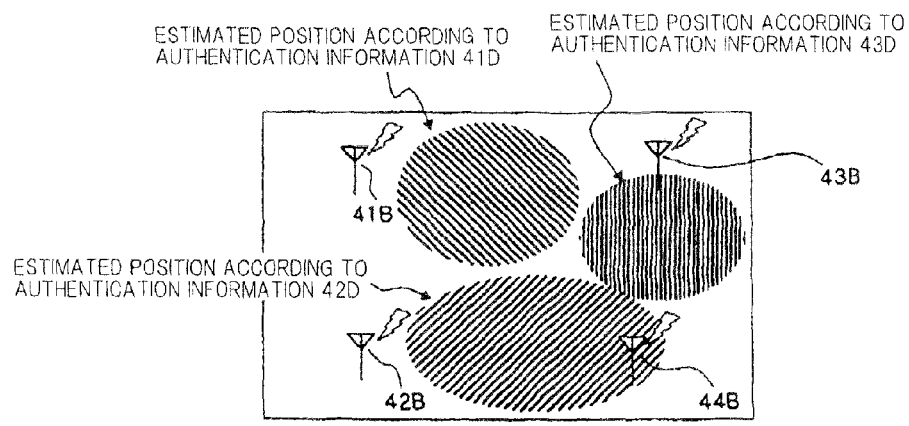
FIG. 6 shows an example of the estimation range of the position according to authentication information acquired from a RFID sensor.

Authentication information input section 13 (or 33) outputs authentication information by the signals from sensors 41B to 41B. If coordinate information of sensors 41B to 44B on a map is given in advance, it is possible to acquire the estimated positions by authentication information 41D to 43D as shown in FIG. 6, by measuring by triangulation the radio wave strength of active RFID which is carried by each person 41A to 43A, the radio wave strength being shown in the measurement result of each sensor 41B to 44B as the authentication information, and authentication information input section 13(33) outputs information including estimated positions as authentication information in addition to the information by RFID.

In information integration section 15, the above described estimated position information are compared, and if a position according to mobile-object activity information is within the estimated range of each authentication information, it is possible to determine that both are in correspondence with each other. Further, it is possible to represent the positions of mobile-object activity information and authentication information as a continuous probability such as a normal distribution centered around a certain coordinate point, and it is also possible to determines that a position information pair are in correspondence when the value obtained by multiplying both position information in a pair becomes a maximum.

Moreover, it is not necessary to assume a normal distribution, and it is also possible to use position estimation results of any form of distribution by tabulating and maintaining the probability to be located at a certain coordinate. Further, when the authentication sensor is a face authentication sensor, an optical ID sensor, or a GPS portable terminal, it is also possible to acquire the correspondence between mobile-object activity information and authentication information in the same fashion as described above.

Further, when fingerprint authentication, vein authentication, iris authentication or RFID having a narrow detection range is used for the authentication sensor, an algorithm which will be described by using the following example shown in FIG. 5 can be used as the algorithm for bringing the mobile-object activity information and the authentication information into correspondence with each other.

Figure 7:
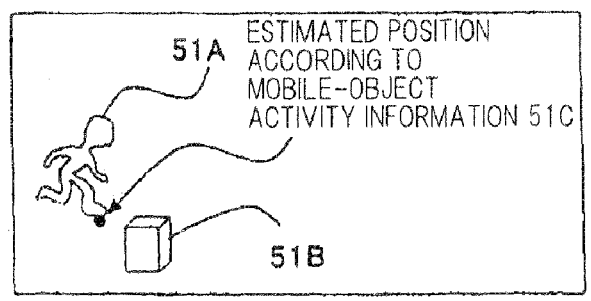
FIG. 7 shows an example indicating the position according to mobile-object activity information and the position of the authentication sensor represented by the coordinates on a map at time "t"

FIG. 7 shows an image which is obtained by converting a camera image into coordinates on a map. Although the position information based on mobile-object activity information 51C of person 51A acquired from a camera image at time t and the position of sensor 51B have been acquired, mobile-object activity information 51C has not been authenticated.

Figure 8:
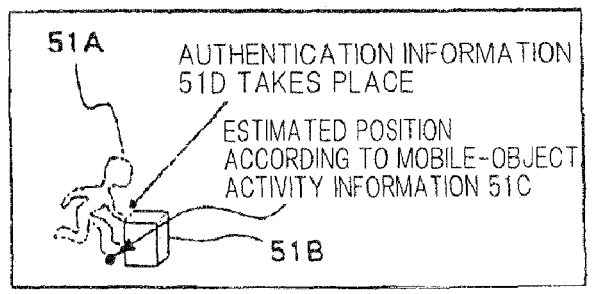
FIG. 8 shows an example indicating the position according to mobile-object activity information and the position according to the authentication information represented by the coordinates on a map at time "t+1"

At time t+1 as shown in FIG. 8, person 51A is authenticated and authentication information 51D is generated; it is found that the position according to authentication information 51D is the same as the position of sensor 51B, and since the mobile-object activity information located closest to sensor 51B is mobile-object activity information 51C, it is determined that mobile-object activity information 51C is corresponds with authentication information 51D, and thereafter it is possible to retain mobile-object activity information 51C in correspondence with authentication information 51D.

In the case of the authentication of clothes or the authentication of optical ID, it is possible to bring the mobile-object activity information into correspondence with the position information of authentication information having the same time information.

In activity determination section 16, when there is mobile-object activity information which is not in correspondence with any authentication information, the authorization level with respect to the mobile-object activity information is recognized as the lowest level regardless of the content of the authorization information. Conversely, when there is authentication information which is not in correspondence with any mobile-object activity information, it can be considered that the mobile object is present in the dead angle of the camera and tentative mobile-object activity information is created to be correspondent with the mobile object, and authorization level is recognized as the lowest level.

Further, in the case of the configuration shown in FIG. 3, since mobile-object activity information is inputted into authorization authentication section 34 from activity analysis section 32, it is possible to set the authorization level in the same manner that recognizing the authorization level in the above described activity determination section 16 has been set, and thus such a configuration can be adopted.

Further, even if there is any authentication information which is not in correspondence with any mobile-object activity information at a certain time t, if corresponding new mobile-object activity information is found at time t+1, tentative mobile activity information may be replaced with newly found mobile-object activity information.

In activity determination processing 26 at activity determination section 16, a list of permitted activities and prohibited activities is referred to depending on the authorization of a detected person or vehicle, and if an illegal activity or a prohibited activity is detected, alarm information is generated.

This operation will be described in detail based on a specific example.

Figure 9:
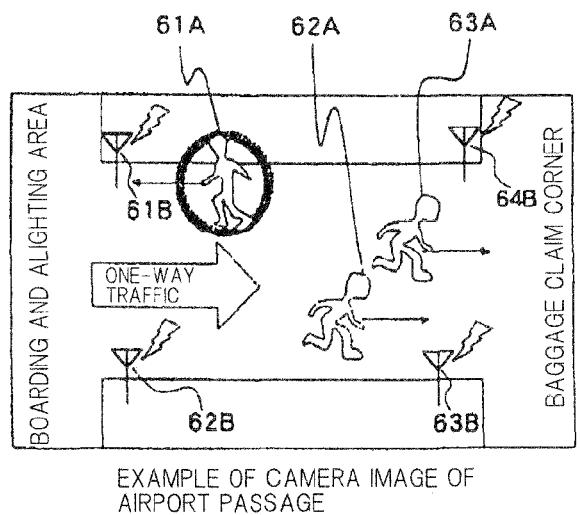
FIG. 9 shows an example of a camera image obtained by photographing an airport path having one-way traffic.

Description will be made of the case of a surveillance system which is configured such that, as with the example of camera image shown in FIG. 9, when an ordinary person who walks in the wrong direction on a one-way corridor is detected in an image, alarm information will be generated.

For example, suppose that a person 61A who walks in the wrong direction in a one-way corridor of an airport is detected. If it is possible to know that person 61A is allowed to freely walk up and down even on a one-way corridor of an airport, as a result of person 61A being authenticated by, for example, active RFID, by referring to the list of permitted activities and prohibited activities according to the authorization level of the person, it is possible to judge that there is no need to issue an alarm, since the activity to walk in the wrong direction on the one-way corridor is within the authorization, and thus no alarm information will be generated.

When the authorization of person 61A cannot be authenticated, or if it is possible to know that the authorization level is low that the activity of freely walking up and down a one-way corridor is not permitted, by referring to the list of permitted activities and prohibited activities, alarm information can be generated.

In this respect, the method of authentication may not be active RFID, but may be the authentication by face, fingerprint, vein, or iris authentication, RFID or optical ID having a narrow detection range, or authentication by clothes.

Figure 10:
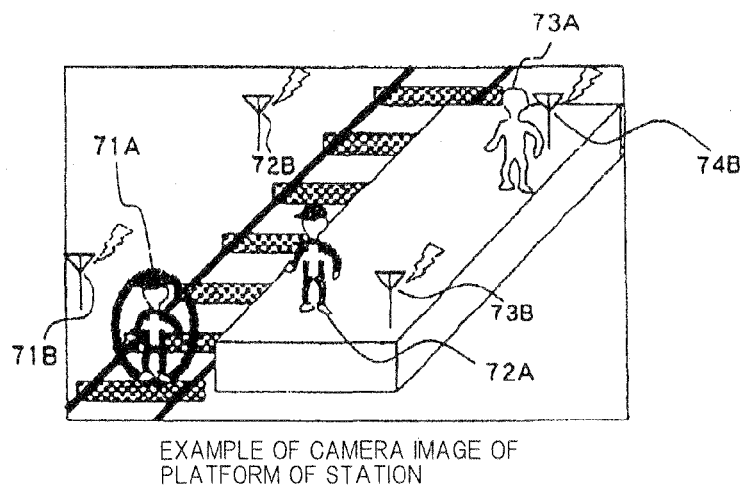
FIG. 10 shows an example of a camera image showing a photograph of a platform of a station.

Next, description will be made on a surveillance system in which, as with the example of camera image shown in FIG. 10, the only area in which entry is permitted is the platform of a station, and this surveillance system is configured to create alarm information if an ordinary person enters the railway track.

Figure 11:
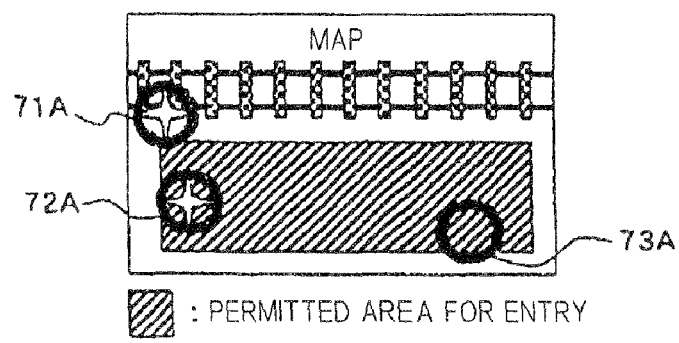
FIG. 11 shows an example of mobile object information, authentication information, and an area of "no admittance without authorization" detected at a platform of a station.

Suppose that person 71A who has entered railway track is detected. FIG. 11 represents FIG. 10 on a map, in which the platform is the only area where entry is admitted, and it is determined that person 71A is in the no-admittance area. If this person 71A is authenticated with active RFID tag or wearing a uniform and if it is found that the person is permitted to enter the railway track according to the person's authorization level, by referring to the list of permitted activities and prohibited activities according to the authorization level of the person; it can be judged that entry into the railway track is within the authorization and therefore there is no need to issue an alarm, and thus no alarm information will be generated.

When the authorization of person 71A cannot be authenticated, or when it can be found that the person is not permitted to enter the railway track due to his/her low authorization level by referring to the list of permitted activities and prohibited activities, alarm information can be created. In this respect, the method of authentication may not be active RFID authentication or clothes authentication, and it is possible to adopt face, fingerprint, vein, or iris authentication, and RFID or optical ID authentication having a narrow detection range.

It is also possible to dynamically change the definition of a permitted activity and a prohibited activity. For example, it is possible to prohibit the entry of a person who has a specific authorization depending on a time zone.

Further, the determination of a permitted activity and a prohibited activity may be based on a combined judgment for a plurality of mobile objects. For example, it may also be configured such that only when there is a person who is a supervisor and who wears a particular uniform, will that person be permitted entry to a particular region. Further, it may also be configured such that a maximum of M persons who wear a uniform are permitted entry. In this respect, M may be freely set to be a positive integer of, for example, 1 to 10.

Further, when the mobile object is a person and the place of surveillance is certain controlled premises, determination algorithm may be configured such that even when a person having the lowest authorization level is detected, if a plurality of persons having the highest authorization level are detected around the aforementioned person, alarm information will not be generated.

Specifically, letting the authorization level be BL and the number of persons detected at each level be N(BL), and letting the number of persons that have the lowest authorization level be N(0), alarm information may be generated when $\Sigma_{BL} BL \times N(BL) \leq A \times N(0)$, where, A is a predetermined constant.

In output processing 27 at output section 17, an alarm depending on the level of alarm information is generated. For example, a display "Intruder in a No-Admittance Zone" may be made with characters, or the characters may be discriminately displayed in yellow, orange and red colors depending on the level, and also the size of characters may be varied depending on the authorization level.

It is also possible to deliver information to E-mail, portable information terminals, and portable telephones etc. and it is also possible to vary the number and the type of people to whom information is to be delivered.

Further, it is also possible to deliver an alarm to other surveillance systems through a network, and also possible to vary the number and the type of systems to which information is delivered depending on the authorization level. It is also possible to generate an alarm sound by a siren or a premises speaker, and to vary the volume of the alarm sound and the frequency thereof depending on the authorization level.

Further, it is also possible to emit light such as blinking light and to vary the blinking speed or to discriminate the color in yellow, orange, and red colors depending on the authorization level.

It is also possible to deliver an image at the same time as outputting an alarm, and to routinely deliver images even when no alarm is outputted.

It is noted that image input section 11, activity analysis section 12, authentication information input section 13, authorization authentication section 14, information integration section 15, activity determination section 16, and output section 17 shown in FIG. 1; and image input section 31, activity analysis section 32, authentication information input section 33, authorization authentication section 34, information integration section 35, activity determination section 36, and output section 37 shown in FIG. 3, may be constructed on a computer that is to be inputted with signals from a CCD camera and sensors; and the present invention includes a program which causes a computer system to execute processing that will be performed in each component described above, and includes recoding medium such as a CD-ROM, floppy disk, DVD-ROM etc. for storing the aforementioned program.

The invention claimed is:

1. A suspicious activity detection apparatus for detecting suspicious activity by using signal generation means, a sensor for receiving a signal from said signal generation means, and image data taken by a camera, comprising:

an image input section captures image data from said camera and outputs said image data;

an activity analysis section detects a mobile object comprising at least one of a person and a vehicle included in an image indicated by image data from said image input section, recognizes upon the detected mobile object being one of the person, the vehicle and a third object, acquires the position of the detected object, and further extracts a motion trajectory of the detected object to output the thus obtained information as a mobile-object activity information;

an authentication information input section acquires an ID number indicated in said signal received by said sensor, a reception time and a reception position of said signal by means of the output of said sensor, and outputs the thus obtained information as an authentication information;

an authorization authentication section stores authorization levels corresponding to said authentication information, obtains authorization level corresponding to an inputted authentication information from said authentication information input section and outputs said inputted authentication information with said obtained authorization level added thereto;

an information integration section brings said authentication information added with authorization level inputted from said authorization authentication section into conformity with said mobile-object activity information inputted from said activity analysis section, and outputs the mobile-object activity information with the authorization level added thereto;

an activity determination section includes a list comprising permitted activities and prohibited activities, recognizes a violating activity and a prohibited activity by comparison to said list with respect to the authorization level added to the mobile-object activity information inputted from said information integration section, and upon detection of an activity indicated by the mobile-object activity information being one of an illegal activity, the prohibited activity and based on a result obtained by comparing a total sum of products of a detected number of persons for each authorization level and the authorization level with a value determined by multiplying a number of persons having the lowest authorization level by a constant, said activity determination section generates and outputs alarm information; and an output section outputs an alarm upon input with alarm information from said activity determination section, wherein upon said authentication information not corresponding to any of the mobile-object activity information with the authorization level added, said activity determination section creates a tentative mobile-object activity information to bring it into conformity with said authentication information, and recognizes the authorization level thereof to be the lowest level.

2. The suspicious activity detection apparatus according to claim 1, wherein activities in the list of a permitted activities and prohibited activities in said activity determination section varies depending on time.

3. A suspicious activity detection apparatus for detecting a suspicious activity by using signal generation means, a sensor for receiving a signal from said signal generation means, and image data taken by a camera, comprising:

an image input section captures image data from said camera and outputs said image data;

an activity analysis section detects a mobile object comprising at least one of a person and a vehicle included in an image indicated by image data from said image input section, recognizes upon the detected mobile object being the person, the vehicle and a third object, acquires the position of the detected object, and further extracts a motion trajectory of the detected object to output the thus obtained information as a mobile-object activity information;

an authentication information input section acquires an ID number indicated in said signal received by said sensor, acquires a reception time and a reception position of said signal by means of the output of said sensor, and outputs the thus obtained information as an authentication information;

an authorization authentication section stores authorization information corresponding to said authentication information as well as a template of one of a uniform and clothes;

obtains a partial image of a person by referring to the position of the person from the mobile-object activity information from said activity analysis section;

compares said partial image with the one of uniform and clothes stored in said template; and upon there being the one of uniform and clothes whose similarity is higher than a predetermined threshold, obtains one of:

said authentication information inputted from said authentication information input section with information about the one of uniform and clothes being the authentication information, and an authorization information corresponding to recognition information, said recognition information being information about the uniform and clothes, to output an inputted authentication information with said authorization information being added thereto;

an information integration section brings said authentication information added with authorization information inputted from said authorization authentication section into conformity with the mobile-object activity information inputted from said activity analysis section, and outputs the mobile-object activity information with the authorization information added thereto;

an activity determination section includes a list comprising permitted activities and prohibited activities, recognizes a violating activity and the prohibited activity by comparison to said list, with respect to the authorization added to the mobile-object activity information inputted from said information integration section, and upon detecting that an activity indicated by the mobile-object activity information being one of an illegal activity and a prohibited activity, generates and outputs alarm information; and an output section outputs an alarm upon input with alarm information from said activity determination section, wherein upon said authentication information corresponding to any of the mobile-object activity information with the authorization level added, said authorization authentication section creates tentative mobile-object activity information to bring it into conformity with said authentication information, and sets the authorization level thereof to be the lowest level.

4. A suspicious activity detection method performed in a suspicious activity detection apparatus comprising:

an image input section, an activity analysis section, an authentication information input section, an authorization authentication section, an information integration section, an activity determination section, and an output section, said suspicious activity detection apparatus detecting a suspicious activity by using signal generation means, a sensor for receiving a signal from said signal generation means, and image data taken by a camera, wherein said image input section captures image data from said camera and outputs said image data;

said activity analysis section detects a mobile object comprising at least one of a person and a vehicle included in an image indicated by image data from said image input section, recognizes upon the detected mobile object being one of the person, the vehicle, and a third object, acquires the position of the detected object, and further extracts a motion trajectory of the detected object to output the thus obtained information as a mobile-object activity information;

said authentication information input section acquires an ID number indicated in said signal received by said sensor, a reception time and a reception position of said signal by means of the output of said sensor, and outputs the thus obtained information as an authentication information;

said authorization authentication section stores authorization information corresponding to said authentication information, obtains authorization information corresponding to an inputted authentication information from said authentication information input section and outputs the inputted authentication information with said obtained authorization information added thereto;

said information integration section brings said authentication information added with authorization information inputted from said authorization authentication section into conformity with the mobile-object activity information inputted from said activity analysis section, and outputs the mobile-object activity information with the authorization information added thereto;

said activity determination section includes a list comprising permitted activities and prohibited activities and recognizes one of a violating activity and a prohibited activity by comparison to said list, with respect to the authorization added to the mobile-object activity information inputted from said information integration section, and upon detecting that an activity indicated by the mobile-object activity information being one of an illegal activity and the prohibited activity, generates and outputs alarm information; and said output section outputs an alarm upon input with alarm information from said activity determination section, wherein upon said authentication information not corresponding to any of the mobile-object activity information with the authorization level added, said activity determination section creates tentative mobile-object activity information to bring it into conformity with said authentication information, and recognizes the authorization level thereof to be the lowest level.

5. A suspicious activity detection method performed in a suspicious activity detection apparatus comprising
an image input section, an activity analysis section, an authentication information input section, an authorization authentication section, an information integration section, an activity determination section, and an output section, said suspicious activity detecting apparatus detecting a suspicious activity by using signal generation means, a sensor for receiving a signal from said signal generation means, and image data taken by a camera, wherein said image input section captures image data from said camera and outputs said image data;

said activity analysis section detects a mobile object comprising at least of a person and a vehicle included in an image indicated by image data from said image input section, recognizes upon the detected mobile object being one of the person, the vehicle and a third object, acquires the position of the detected object, and further extracts a motion trajectory of the detected object to output the thus obtained information as a mobile-object activity information;

said authentication information input section acquires an ID number indicated in said signal received by said sensor, acquires a reception time and a reception position of said signal by means of the output of said sensor, and outputs the thus obtained information as an authentication information;

said authorization authentication section stores authorization information corresponding to said authentication information as well as a template of one of a uniform and clothes;

obtains a partial image of a person by referring to the position of the person from the mobile-object activity information from said activity analysis section;

compares said partial image with the one of uniform and clothes stored in said template; and upon there being the one of uniform and clothes whose similarity is higher than a predetermined threshold, obtains one of:

said authentication information inputted from said authentication information input section with information about the one of uniform and clothes being the authentication information, and an authorization information corresponding to recognition information, said information being information about the one of uniform and clothes, to output an inputted authentication information with said authorization information being added thereto;

said information integration section brings said authentication information added with authorization information inputted from said authorization authentication section into conformity with the mobile-object activity information inputted from said activity analysis section, and outputs the mobile-object activity information with the authorization information being added thereto;

said activity determination section includes a list comprising permitted activities and prohibited activities, and recognizes one of a violating activity and a prohibited activity by comparison to said list with respect to the authorization added to the mobile-object activity information inputted from said information integration section, and upon detecting that an activity indicated by the mobile-object activity information being one of an illegal activity and the prohibited activity, generates and outputs alarm information;

said output section outputs an alarm upon input of alarm information from said activity determination section, wherein upon said authentication information not corresponding to any of the mobile-object activity information with the authorization level added, said authorization authentication section creates tentative mobile-object activity information to bring it into conformity with said authentication information, and sets the authorization level thereof to be the lowest level.

6. The suspicious activity detection method according to claim 5, wherein activities in the list of permitted activities and prohibited activities in said activity determination section varies depending on time.

* * * * *